Figure 1:
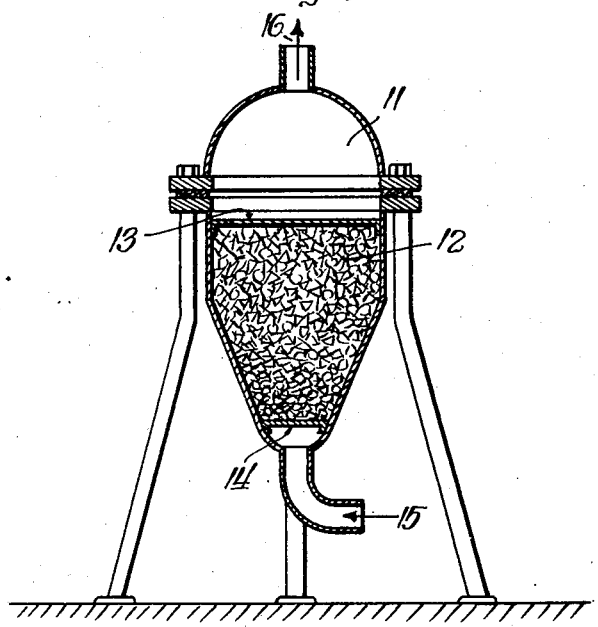

Feb. 22, 1938.    G. A. KRAUSE    2,109,151
PROCESS FOR ARTIFICIALLY AGING ALCOHOLIC LIQUIDS AND PERFUMES

Filed Aug. 16, 1933

Inventor
Georg Alexander Krause
By [signature]
Atty.

Patented Feb. 22, 1938

2,109,151

UNITED STATES PATENT OFFICE 2,109,151

PROCESS FOR ARTIFICIALLY AGING ALCOHOLIC LIQUIDS AND PERFUMES

Georg Alexander Krause, Munich, Germany, assignor, by mesne assignments, to Katadyn Inc., New York, N. Y., a corporation of Delaware Application August 16, 1933, Serial No. 685,502
In Germany August 16, 1932

5 Claims. (Cl. 204—26)

Alcoholic beverages, such as cognac, brandy, cordials and the like, as well as perfumes and other substances of a related character require as is known a long period of maturing, until they acquire a full, well rounded taste and aroma. Immediately after being made they contain harsh tasting and smelling substances which decompose gradually during storing and are converted into indifferent or mild tasting and smelling compounds. Especially, the alcohol which is distilled from potatoes or similar starch containing raw materials and which forms the basis of most distilled wines, cordials and perfumes contains, even after most careful purification, harsh irritating ingredients which cover up the aroma of the substances later added for taste and odor, and prevent the proper development thereof. Freshly prepared alcoholic beverages and perfumes are, therefore, practically unmarketable. A prolonged storing period, however, means an undesirable burden on production because of the necessity of invested capital, storage vessels and space.

The observation was made that alcoholic beverages and perfumes and the like assume a rich mild taste and fragrance in surprisingly short time, if they are treated with certain heavy metals or heavy metal compounds. Such metals are in the first place the oligodynamic and catalytic, of which platinum, iridium, gold, silver, copper, cadmium, cobalt and nickel may be mentioned. Silver proved to be very effective, especially if it is used in a condition of a microscopically rough, fine-layered surface, as has been proved effective for some time in connection with oligodynamic sterilization. Besides the mentioned metals, their alloys as well as their inorganic and organic compounds are to be considered.

The treatment of the liquid with the active material can be effected in various ways. By means of the contact method the liquid is brought for a short time in contact with the active material. This can be done by feeding the liquid into a vessel that is provided with active metal, such as silver. It is advantageous in this regard not only to coat the walls of the container with the active material, but to equip the entire container with inserts or filling bodies which consist of or are coated with the active material. By way of example, the vessel can be filled with small porcelain rings or with sand or gravel-like material of 2–4 mm. grain which are coated with a fine layer of silver. The liquid can be allowed either to remain in the treating vessel for a short time or to run through the vessel continuously. According to the desired degree of activation the speed of flow and the depth of the active layer can be so adjusted and proportioned that a definite time of contact between the liquid and the active substances is assured. The active layer can be also adapted in the form of a filter, so that the liquid is clarified and matured in a single operation.

Besides the mentioned metals their soluble compounds are also suited to the process explained above, thus, for example, the filling bodies may be coated with silver phosphate instead of metallic silver.

Another means of treating the liquid according to the present invention is the electrical method. The liquid to which, if necessary, a slight conductivity is imparted by suitable additions, is allowed to flow through a vessel in which it is exposed to a weak direct electric current between electrodes, of which at least the anode consists of the active metal, for example silver. By means of adjusting the rate of liquid flow in relation to the electric current the degree of treatment can be regulated at will.

Figure 2:
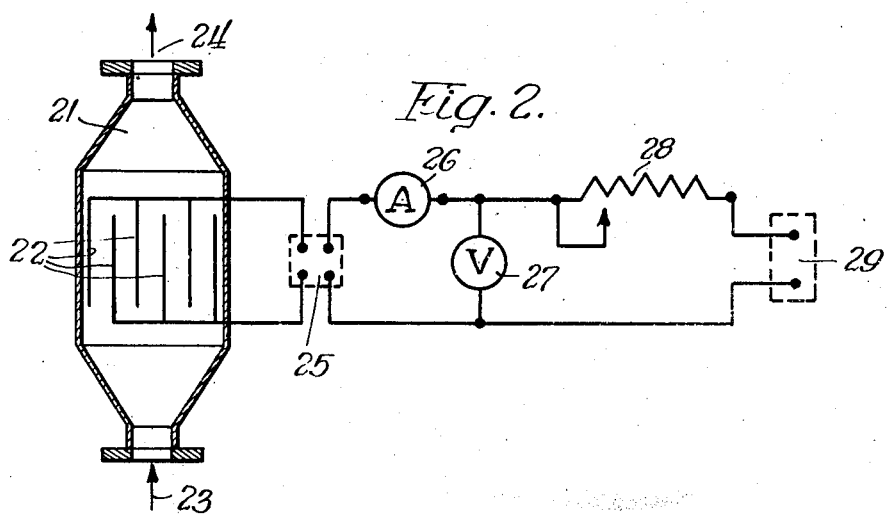

The invention, in some of its embodiments, is illustrated in the accompanying drawing in which Fig. 1 illustrates the above intimated contact method; and Fig. 2 shows an embodiment of the electrical method.

Referring now to Fig. 1, the apparatus shown therein comprises a vessel containing bodies coated with active material or consisting of active material. Numeral 11 may be the dome of the vessel which is joined, as shown, with the lower portion containing the activating bodies mentioned above and indicated by the numeral 12. The walls of the vessel and its parts may also be provided with active material or may consist of such material. If desired, suitable neutral material may be employed for the vessel. The liquid is arranged to enter the apparatus at 15 and to leave the same at 16. The activating bodies 12 may be made, for example, of quartz, gravel or the like which is suitably coated with active material. Filters or sieves 13 and 14 may be disposed as shown, in the nature of retaining members for securing the desired distribution of the liquid flow over the entire cross sectional area of the apparatus. It is understood, of course, that in place of the activating bodies 12 there may be provided other means for taking care of the activating functions. It is possible for example, to provide in the interior of the vessel suitable filters without any activating bodies, as shown. Legs or uprights may be secured to the flanges holding the upper and lower portions of the receptacle or vessel as shown in the drawing in order to place the device conveniently for operation. It should be observed that the liquid, upon entering the device through the inlet 15 spreads gradually within the device due to the shape of the treating chamber, thus coming into contact with the bodies disposed therein.

The apparatus indicated in Fig. 2 comprises a vessel 21 having an inlet 23 and an outlet 24, the liquid flowing in the direction of the arrows. The inlet and outlet openings are in each structure shown substantially of the same size. Numeral 22 indicates a number of members or plates made of active metal, for example, of silver or of suitably treated carriers of a suitable active substance. These plates are disposed to serve as cathodes and as anodes, respectively, and are for this purpose included in the circuit to the pol-changing device 25, provided for periodically changing the polarity of the electrodes. The circuit extends from the pol-changer 25 to a source of current 29 by way of the amperemeter 26 and the adjustable resistance 28. The voltmeter 27 may be bridged across the feeding conductors as shown. The current source may be an ordinary portable battery since only relatively weak current is required for the operation of the device. The operating current may be accurately adjusted by means of the resistance 28 and the instruments 26 and 27 which will serve the purpose of indicating operating conditions at any time and will also serve for the purpose of accurately determining the desired activating conditions.

It will be understood from the description of the apparatus rendered above that the degree of activation during the time of contact between the activating bodies and the liquid may be controlled by the reciprocal adjustment either of the layer, such as the layer 12 in Fig. 1 and the rate of flow or merely by the rate of flow relative to the amount of current in the case of the embodiment shown in Fig. 2.

Additional possibilities for practicing the invention are indicated below.

A measured amount of a soluble metallic salt may be directly dissolved in the liquid or a predetermined amount of a colloidal metal or metallic salt solution may be added to the liquid. The invention is in no way limited to the cited methods of treatment, but is capable of realization with the use of any method according to which the active material is allowed to act on the liquid in a regulated manner.

Very favorable results were obtained with various kinds of brandies, for example, gentian, cherry brandy, Nordhäuser and the like. Likewise sweet cordials and wines were successfully treated. With regard to wines, another favorable effect is gained in that the treatment according to the invention prevents the so-called mould and the growth of acetifying bacteria. For example, a white wine after having been treated according to the invention may be left for days exposed to the air without growing mouldy or turning acid, as is otherwise invariably the case.

In many instances it is preferable to treat not the finished product but the initial or intermediate product before the addition of the aroma or typifying substances, because otherwise the aromatic material would be injured. Thus in the case of brandy made of wine it is advantageous to first treat the young and raw suitably diluted wine distillate with metals and then add the aromatic substances to it. Likewise frequently in the production of brandy of all varieties not the finished product but the properly diluted alcohol or the water serving as diluent may be treated and the taste-imparting substances may be added afterwards.

The invention may be also applied to great advantage in the preparation of pure 96% alcohol from raw potato spirit. In order to bring potato spirit to the requisite alcoholic content and at the same time to free it from evil tasting and smelling ingredients it is usually subjected to a bothersome rectification, filtration and purification with activated carbon. The same result can be attained more quickly and with less expense, if a treatment with active metal conforming to the invention is introduced somewhere in the purifying process.

Particular care is to be observed in the treatment of perfumes. The treatment of finished perfumes is mostly impossible, because the sensitive odoriferous substances suffer under the direct influence of the active material. As a rule the initial liquid for perfumes is treated before the addition of the fragrant substances. Essentially the alcohol itself is to be considered for treatment or under certain circumstances distilled water or the mixture of both liquids. If the fragrant substances are added after the treatment, then the desired aroma at once manifests itself richly and completely, while without this novel treatment of the initial matter the harsh irritating odoriferous ingredients almost obliterate the fragrance of the added substance, with the treatment as described they will entirely disappear.

In the process according to the invention the amounts of metal passing into the liquids are extremely small and for the most part scarcely recognizable with the usual analytic methods. One can naturally through repeated treatment or by regulating the conditions of treatment raise this metal content of the liquid at will. Inasmuch as the so attained metal content causes trouble in its later application, it may be separated according to one of the known chemical, electrochemical or physical methods.

It may be mentioned that the procedure according to the invention can be carried out without any external addition of energy, especially without heating, in which respect it distinguishes favorably from other artificial aging processes. Another great merit of this rapid aging and maturing process is that the product not only displays its complete mild aroma immediately after its preparation, but that no reaction occurs with subsequent storing as is the case with other rapid aging methods. In particular, in the preparation of perfumes, according to this invention, an odor fixative such as musk and ambergris does not have to be added. Finally it may be pointed out that the perfumes, if the procedure has been carried out with an oligodynamically active metal such as silver, have a more or less strong sterilizing effect corresponding to the degree of activation. In this manner a perfume is obtained that acts simultaneously as a disinfectant.

What I claim is:

1. A process for artificially rapidly aging highly alcoholic liquids which consists in solely adding to the liquid to be aged predetermined amounts of a colloidal solution of an oligodynamically active metal.

2. In a process for treating highly alcoholic liquids normally requiring a period of aging for maturing the same, the steps comprising, passing at least part of said liquid in a controlled flow through a chamber and subjecting said liquid in said chamber for a very short time to the action of relatively weak direct current maintained between electrodes of which at least the anode consists of oligodynamically active metal whereby oligodynamically active substance is transferred into said liquids to accelerate the maturing thereof.

3. The process of rapidly aging alcohol liquids comprising, directing said liquids in a substantially continual flow through a vessel, subjecting said liquids in said vessel solely to the action of oligodynamically active metal whereby said liquid is activated by the transfer thereinto of minute amounts of metal in ionic form, and regulating the degree of activation of said liquid by selectively adjusting the speed of flow of said liquid through said vessel relative to said metal, whereby a definite time of contact between said liquid and said active metal is determined.

4. The process defined in claim 3, together with the step of connecting said oligodynamically active metal to a source of weak electric current, whereby metal is transferred into said liquid by the action of said current to activate said liquid, and regulating the degree of activation of said liquid by selectively adjusting the rate of flow of said liquid relative to said current, whereby relatively determined amounts of metal are transferred into said liquid to cause the rapid aging thereof.

5. The process defined in claim 3, together with the step of connecting said oligodynamically active metal to a source of weak electric current, whereby metal is transferred into said liquid by the action of said current to activate said liquid, and regulating the degree of activation of said liquid by selectively adjusting the rate of flow of said liquid relative to said current, whereby relatively determined amounts of metal are transferred into said liquid to cause the rapid aging thereof, the voltage of said current being of a magnitude of the order of about 2 volts.

GEORG ALEXANDER KRAUSE.